United States Patent
Baier et al.

(10) Patent No.: US 7,151,966 B1
(45) Date of Patent: Dec. 19, 2006

(54) SYSTEM AND METHODOLOGY PROVIDING OPEN INTERFACE AND DISTRIBUTED PROCESSING IN AN INDUSTRIAL CONTROLLER ENVIRONMENT

(75) Inventors: John Joseph Baier, Mentor, OH (US); David Michael Callaghan, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 562 days.

(21) Appl. No.: 10/162,315

(22) Filed: Jun. 4, 2002

(51) Int. Cl.
G06F 15/16 (2006.01)
G05B 11/01 (2006.01)

(52) U.S. Cl. .................. 700/19; 709/203; 709/230; 709/238

(58) Field of Classification Search .......... 700/17, 700/18, 19, 20, 24, 25, 83, 86, 87; 707/1, 707/100, 102; 709/203, 223, 224, 225, 230, 709/232, 238
See application file for complete search history.

(56) References Cited

U.S. PATENT DOCUMENTS

| | | | |
|---|---|---|---|
| 5,122,948 A | 6/1992 | Zapolin | |
| 5,611,059 A | 3/1997 | Benton et al. | |
| 5,844,794 A | 12/1998 | Keeley | |
| 5,845,149 A | 12/1998 | Husted et al. | |
| 5,978,568 A | 11/1999 | Abraham et al. | |
| 6,279,113 B1 | 8/2001 | Vaidya | |
| 6,381,502 B1 | 4/2002 | Rudder et al. | |
| 6,400,996 B1* | 6/2002 | Hoffberg et al. | 700/83 |
| 6,412,032 B1 | 6/2002 | Neet et al. | |
| 6,457,024 B1 | 9/2002 | Felsentein et al. | |
| 6,463,338 B1 | 10/2002 | Neet | |
| 6,535,926 B1 | 3/2003 | Esker | |
| 6,624,388 B1* | 9/2003 | Blankenship et al. | 700/145 |
| 6,640,145 B1* | 10/2003 | Hoffberg et al. | 700/83 |
| 6,651,062 B1 | 11/2003 | Ghannam et al. | |
| 6,675,226 B1 | 1/2004 | Nair et al. | |
| 6,708,074 B1 | 3/2004 | Chi et al. | |
| 6,714,974 B1 | 3/2004 | Machida | |
| 6,732,165 B1 | 5/2004 | Jennings, III | |
| 6,732,191 B1* | 5/2004 | Baker et al. | 710/1 |
| 6,819,960 B1 | 11/2004 | McKelvey et al. | |

(Continued)

FOREIGN PATENT DOCUMENTS

WO    0111586 A    2/2001

OTHER PUBLICATIONS

Vasudevan, A Web Services Primer, Apr. 4, 2001, XML.com, http://webservices.xml.com/pub/a/ws/2001/04/04/webservices/index.html.*

(Continued)

*Primary Examiner*—Leo Picard
*Assistant Examiner*—Charles Kasenge
(74) *Attorney, Agent, or Firm*—Amin Turocy & Calvin LLP; R. Scott Speroff

(57) ABSTRACT

The present invention relates to a system and methodology providing virtual and remote component interactions in a networked industrial control environment. One or more components of an industrial control system are defined as a web service, wherein the components cooperate to support distributed controller functionality in all or portions of a virtual operating framework. For example, the components can include processing, logic, I/O and status components of an industrial control system. Standard and commonly available interfaces describe controller functionality in terms of the services, whereby controller applications are constructed via the components and associated interfaces. This can include discovery of other related services and employment of common web protocols to communicate between the services.

36 Claims, 11 Drawing Sheets

U.S. PATENT DOCUMENTS

| | | |
|---|---|---|
| 6,895,532 B1 | 5/2005 | Raynham |
| 6,904,600 B1 | 6/2005 | James et al. |
| 6,907,302 B1 | 6/2005 | Karbassi |
| 6,965,802 B1 | 11/2005 | Sexton |
| 6,970,913 B1 | 11/2005 | Albert et al. |
| 7,032,045 B1 | 4/2006 | Kostadinov |
| 2002/0046239 A1 | 4/2002 | Stawikowski et al. |
| 2002/0068983 A1 | 6/2002 | Sexton |
| 2002/0073236 A1 | 6/2002 | Helgeron et al. |
| 2002/0156926 A1 | 10/2002 | Batka |
| 2002/0161745 A1* | 10/2002 | Call .................. 707/1 |
| 2003/0009253 A1 | 1/2003 | McIntyre et al. |
| 2003/0009572 A1 | 1/2003 | Thurner |
| 2003/0051074 A1 | 3/2003 | Edwards |
| 2003/0208545 A1 | 11/2003 | Eaton et al. |
| 2005/0038528 A1 | 2/2005 | McKlvey et al. |
| 2005/0055429 A1 | 3/2005 | Abele |
| 2005/0125441 A1 | 6/2005 | Clemens et al. |

OTHER PUBLICATIONS

W3C, Web Services Description Language, http://www.w3.org/TR/wsd1.

European Search Report dated Mar. 18, 2004 for European Patent Application Serial No. 03026339, 3 Pages.

COMPUQUEST, Inc., SPM-IM-Instant Messaging Client for SpreadMsg Wireless Messaging Software, http://www.compuquestinc.com/spmim.html.

COMPUQUEST, Inc., SpreadMsg Life—Data Capture, Scanning, Extraction & Rule Based Instant Messaging Software, http://web.archive.org/web/20020813080848/ http://www.compuquestinc.com/spmsgl.html.

International Business Machines Corporation, Cross platform instant messaging using web services, Research Disclosure, Kenneth Mason Publications, Hampshire, GB, vol. 458, No. 156, Jun. 2002.

* cited by examiner

SYSTEM AND METHODOLOGY PROVIDING OPEN INTERFACE AND DISTRIBUTED PROCESSING IN AN INDUSTRIAL CONTROLLER ENVIRONMENT

TECHNICAL FIELD

The present invention relates generally to industrial control systems, and more particularly to a system and methodology to facilitate distributed controller processing in an open and networked industrial controller system.

BACKGROUND OF THE INVENTION

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values. Control programs may be executed in a series of execution cycles with batch processing capabilities.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

Various control modules of the industrial controller may be spatially distributed along a common communication link in several racks. Certain I/O modules may thus be located in close proximity to a portion of the control equipment, and away from the remainder of the controller. Data is communicated with these remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, etc.), ControlNet®, DeviceNet® or other network protocols (Foundation Fieldbus (Hi and Fast Ethernet) Modbus TCP, Profibus) and also communicate to higher level computing systems. Industrial controllers utilize the aforementioned technologies along with other technology to control multiple applications ranging from complex and highly distributed to more traditional and repetitious applications.

At the core of the industrial control system, is a logic processor such as a Programmable Logic Controller (PLC) or PC-based controller. Programmable Logic Controllers are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

User programs are generally distributed or downloaded to PLCs in a point-to-point manner, wherein respective applications are tested and put into operation in accordance with an isolated integration process. Many times a trial and error process is employed, whereby individual stations in a control process are tweaked or tuned as necessary—during start-up of an application involving several and often times remote PLCs. Thus, if several PLCs control an overall manufacturing process, application distribution and testing is often limited to loading PLCs individually and then tweaking individual control stations locally to facilitate the overall manufacturing or control process. In many cases, some PLC stations run at peak capacity, whereas other controllers in the process are lightly loaded. Moreover, in the process of downloading, testing and ultimately deploying an application, coordination between components is limited due to the manual nature of the aforementioned integration processes.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to provide an open framework for control and communications within a networked industrial controller environment. A plurality of components related to industrial control cooperates via a network to facilitate one or more aspects of a control process. The components can include processing components, logic components, I/O components and status components, wherein at least one of the components is configured as a web service. An open standards interface is employed to facilitate interactions between the components and the web service. By adapting these and other control components as a service, controller functionality that is often associated with dedicated and/or hardwired systems can be virtualized across a network such as the Internet. Thus, if all the components are configured as services (or portions thereof) and interact via commonly-defined interface standards, industrial controllers and associated processes can operate within a virtual operating environment. In this manner, the actual components of the service logically cooperate to perform a control process, yet are physically served from remote and often-times unrelated web locations.

In one aspect of the present invention, controller components operate as XML web services providing fundamental building blocks for distributed control applications on the Internet, for example. Open interface standards facilitate communication and collaboration among users and applications to create an environment whereby the web services support a distributed platform for application integration. Thus, controller applications can be constructed employing multiple web services from various sources that cooperate together regardless of where the applications reside, how they are implemented and/or how they are served.

The web services can expose functionality to construct control applications through a standard web protocol. In some cases, the protocol can be Simple Object Access Protocol (SOAP) and/or other XML or scripting language. In this manner, services employing commonly available and open interface standards describe associated interfaces in enough detail to enable remote application components to communicate and interact in various control processes. Interface descriptions can be provided in an XML document such as a Web Services Description Language (WSDL) document, for example. Moreover, web services can also be registered, wherein potential users and/or systems can determine services in an efficient manner. This can be achieved via a Universal Discovery Description and Integration (UDDI) component.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology providing virtual and remote component interactions in a networked industrial control environment. One or more components of an industrial control system are defined as a web service, wherein the components cooperate to support distributed controller functionality in all or portions of a virtual operating framework. For example, the components can include processing, logic, I/O and status components of an industrial control system. Standard and commonly available interfaces describe controller functionality in terms of the services, whereby controller applications are constructed via the components and associated interfaces. This can include discovery of other related services and employment of common web protocols to communicate between the services.

Figure 1:
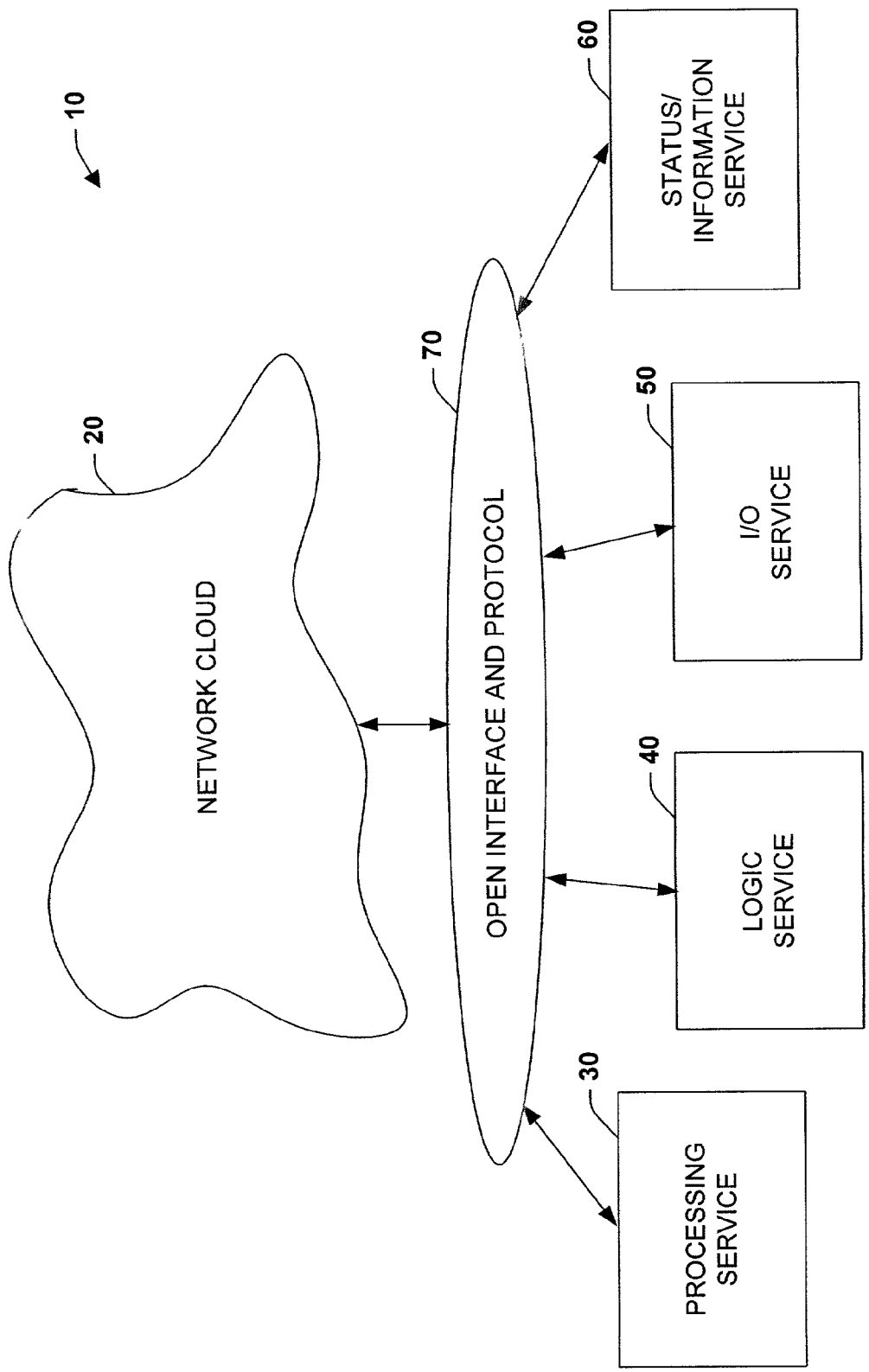
FIG. 1 is a schematic block diagram illustrating an industrial control system and open services architecture in accordance with an aspect of the present invention.

Referring initially to FIG. 1, a system 10 illustrates an industrial control system (e.g., PLC, PC-based controller or equivalent) and open services architecture in accordance with an aspect of the present invention. A network cloud 20 represents communications to a plurality of servers, clients, and/or industrial control systems that provide one or more aspects of serving and/or receiving control functionality via a network. The cloud 20 can represent open and public networks such as the Internet and/or can be restricted to a local factory network. One or more industrial control services can be accessed from the cloud to cooperate to perform industrial control operations as will be described in more detail below. This can include a processing service 30 that performs execution of a logic program to perform control. Such processing can be performed by a network server executing logic operations and/or a network configured Programmable Logic Controller (PLC) that performs processing functions.

A logic service 40 provides executable controller logic (or data affecting controller operations) that can be processed by the processing service 30 to perform control operations. An I/O service 50 provides input and receives output data that drives control decisions of the processing service 30 (and/or PLC system accessing I/O service). I/O can be actual physical I/O for example, such as a network card adapted to control industrial processes (e.g., network card or PLC system controlling AC/DC inputs/outputs, analog voltage/current), and/or logical I/O. As an example of logical I/O, an input service may provide power factor data for a city or region and be located at a remote web server. A remotely located PLC system may receive input data from the input service, perform computations in a local factory environment regarding energy usage, and control plant power or factory conditions to achieve more efficient energy consumption in view of the power factor input data (e.g., roll-back large burner operations during peak demand periods indicated by the power factor data). Another service that can be provided is a status and information service 60 that includes data relating to the processing service 30, program execution, controller operations, communications status, I/O status, and substantially any data indicating status associated with industrial control operations and/or associated services.

An open standards interface and protocol 70 is employed to provide interactions between the services 30–60 and the network cloud 20. Open standards define readily available and public specifications for interfacing to and from remote services (e.g., SOAP, XML, WSDL). As will be described in more detail below, this can include XML data structures that describe the service and the data for interacting with the service. As an example, the processing service 30 can load a program from the logic service 40 via the open interface and protocol 70. The logic service 40 can specify an associated I/O service 50 and status service 60 that are to be utilized in the performance of the program. As can be appreciated various combinations of services 30–60 are possible. For example, a remote PLC having associated I/O and adapted with an open interface may request and receive its logic program from the logic service 40 via the cloud 20 before or during execution of control operations at the remote location. The remote PLC can also perform logic decisions by receiving status information from the status service 60 that can include information relating to other PLC's and/or I/O that contribute to other portions of a control process.

Figure 2:
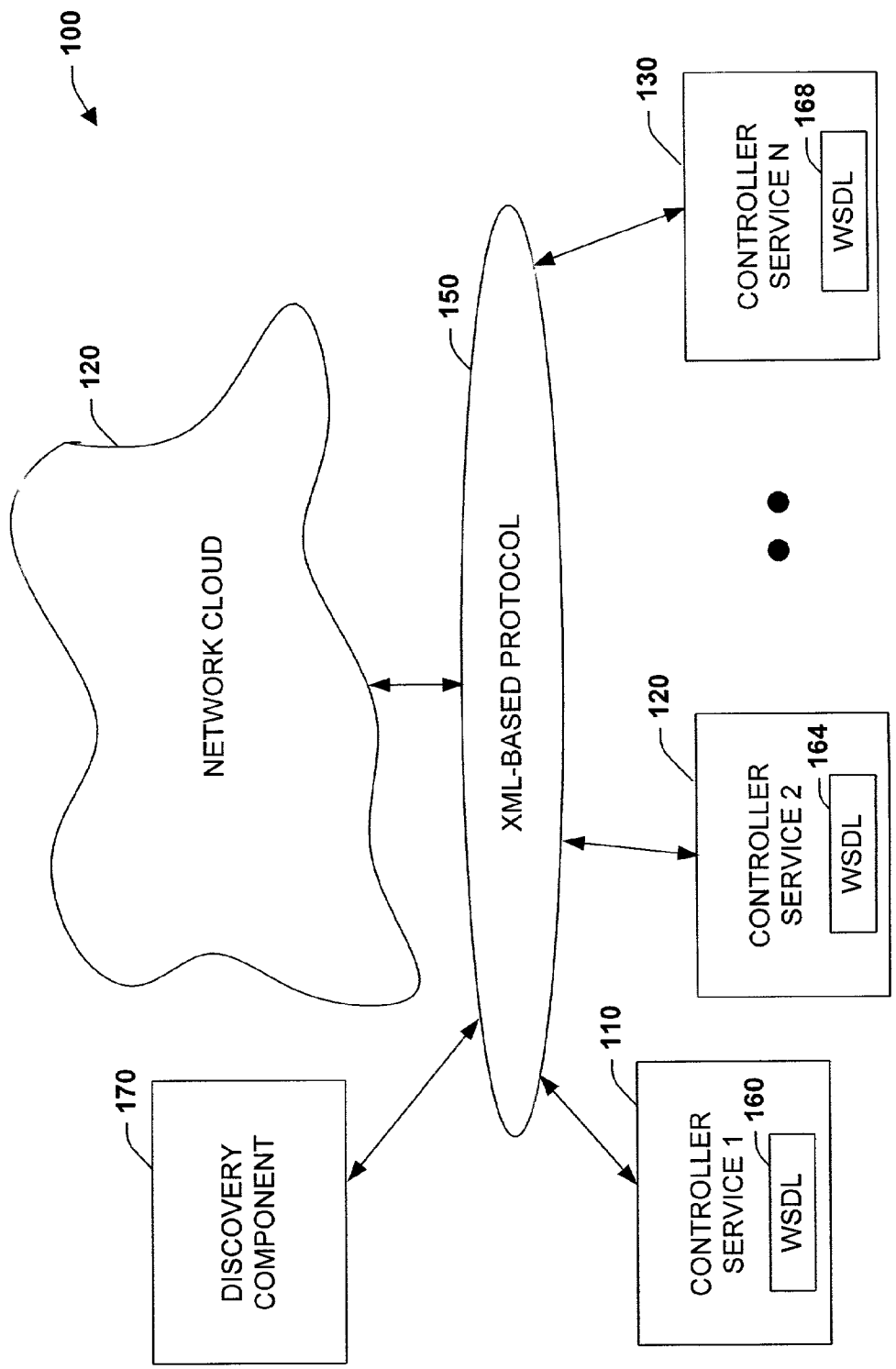
FIG. 2 is a schematic block diagram illustrating open interface and protocols in accordance with an aspect of the present invention.

Referring now to FIG. 2, a system 100 illustrates open interface and protocols in accordance with an aspect of the present invention. A plurality of controller services 110 through 130 interact with a network cloud 140 via an XML-based protocol 150. As described above, the protocol 150 should be an open standard defined for use on a public communications system such as the Internet. In one aspect, a Simple Object Access Protocol (SOAP) 150 can be employed as a communications protocol for XML Web services. SOAP is an open specification that defines an XML format for messages between services. The specification can include describing how to represent program data as XML and how to utilize SOAP to perform Remote Procedure Calls (RPC). These optional parts of the specification are employed to implement RPC-style applications, wherein a SOAP message containing a callable function, and the parameters to pass to the function, is sent from a client such as a control system, and the server returns a message with the results of the executed function. Most current implementations of SOAP support RPC applications since programmers who are familiar with COM or CORBA applications understand the RPC style. SOAP also supports document style applications whereby the SOAP message is provided as a wrapper around an XML document. Document-style SOAP applications are very flexible, wherein a control system X Web service can take advantage of this flexibility to build controller services that may be difficult to implement with RPC.

Other parts of the SOAP specification define what an HTTP message that contains a SOAP message may appear as. HTTP binding can be important because HTTP is supported by almost all current operating systems. HTTP binding is optional, but almost all SOAP implementations support it as one possible standardized protocol for SOAP. For this reason, there's a common misconception that SOAP requires HTTP. Some implementations support MSMQ, MQ Series, SMTP, or TCP/IP transports, but almost all current XML Web services employ HTTP because it is ubiquitous. Since HTTP is a core protocol of the Web, most organizations have a network infrastructure that supports HTTP. Security, monitoring, and load-balancing infrastructure for HTTP are also readily available. It is to be appreciated that commercially available tools can be employed to construct SOAP messages directly. This can include a SOAP toolkit to create and parse SOAP messages. These toolkits generally translate function calls from a computer language to a SOAP message. For example, a Microsoft SOAP Toolkit 2.0 translates COM function calls to SOAP and an Apache Toolkit translates JAVA function calls to SOAP.

The controller services 110 through 130 can also employ an open interface standard such as a Web Service Description Language (WSDL) illustrated at 160 through 168 in order to provide interactions with the controller services. In general, a WSDL file or interface is an XML document that describes a set of SOAP messages and how the messages are exchanged. In other words, WSDL 160–164 is to SOAP what Interface Description Language (IDL) is to CORBA or COM. Since WSDL is in XML format, it is readable and editable but in most cases, it is generated and consumed by software. WSDL specifies what a request message contains and how the response message will be formatted in unambiguous notation. As an example, an I/O service can specify how inputs are to be requested from the service and how outputs can be sent to the service in the form of a response. In another aspect, inputs can be requested from an input service, wherein the response is a confirmation that the inputs were received. Outputs can be sent to an output service in the form of a request, wherein the response from the service is that the outputs were received.

The notation that a WSDL file utilizes to describe message formats is based on an XML Schema standard which implies it is both programming-language neutral and standards-based which makes it suitable for describing XML Web services interfaces that are accessible from a wide variety of platforms and programming languages. In addition to describing message contents, WSDL defines where the service is available and what communications protocol is employed to communicate to the service. This implies that a given WSDL file defines substantially all matters required to write a program to work with an XML Web service. As noted above, there are several tools available to read a WSDL file and generate code to communicate with an XML Web service. For example, some of the most capable of these tools are in Microsoft Visual Studio®.NET. It is noted that further reference to the WSDL specification can be found at http://www.w3.org/TR/wsdl, if desired.

The system 100 can also include a discovery component 170, wherein the controller services 110–130 can be published and determined. In one aspect, a Universal Discovery Description and Integration (UDDI) can be provided at 170 that serves as a type of logical "phone" directory (e.g., "yellow pages," "white pages," "green pages") describing Web services. A UDDI directory entry is an XML file that describes a controller system and the services it offers. There are generally three parts to an entry in the UDDI directory. The "white pages" describe the component offering the service: name, address, and so forth. The "yellow pages" include industrial categories based on standard taxonomies such as the North American Industry Classification System and Standard Industrial Classifications. The "green pages" describe the interface to the service in enough detail for users to write an application to employ the Web service. The manner in which services are defined is through a UDDI document called a Type Model or tModel. In many cases, the tModel contains a WSDL file that describes a SOAP interface to an XML Web service, but the tModel is generally flexible enough to describe almost any kind of service. The UDDI directory also includes several options to search for the services to build remote applications. For example, searches can be performed for providers of a service in a specified geographic location or for an entity of a specified type. The UDDI directory can then supply information, contacts, links, and technical data to enable determinations of which services to employ in a control process.

Figure 3:
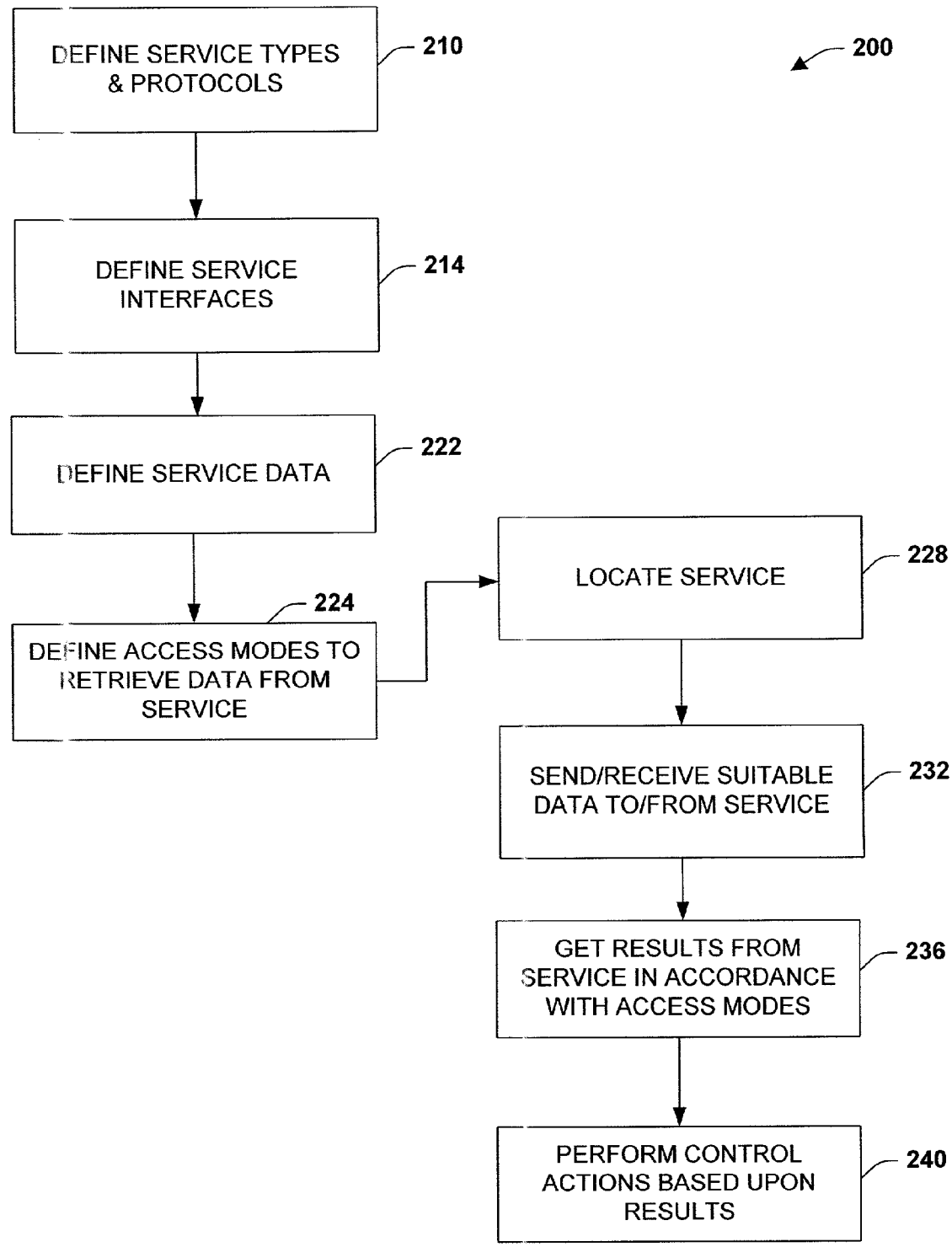
FIG. 3 is a flow diagram illustrating a process providing controller web services in accordance with the present invention.

FIG. 3 is a flow diagram illustrating a methodology 200 providing controller web services in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 210, service types and protocols are defined in accordance with open standards. As noted above, this can include XML based protocols such as SOAP for interacting with the service. The service types can be defined as a processing service, a logic, service, an input and/or an output service, and a controller information service, for example. At 214, service interfaces are defined in accordance with open standards. For example, this can include WSDL interfaces that describe how control requests and responses are processed by the respective services.

It is noted that other publicly available standards/protocols/services may be employed in the present invention. For example an enterprise service may be defined that coordinates different portions of a business or control process (e.g., batch, quality, ERP) throughout various portions of an organization. To facilitate consistent batch quality, for example, a service can be defined and offered which follows an international standard for modular batch automation, such as defined by standard (S88.00.01), which also defines models and terminology for identifying equipment capability and procedures for producing batches. These procedures and capabilities can be defined and offered by an associated service. Another international standard includes Enterprise to Manufacturing Control Integration, such as S95.00.01 and S95.00.02. These standards specify the information flow between enterprise and manufacturing control. Thus, remote web services can be offered that are modeled on these international standards and operate to coordinate control processes from the plant floor throughout the businesses that employ the control processes.

Proceeding to 222, service data is defined that describes data consumed by and produced by a respective service. In general, XML is employed to define the data but other type data can also be exchanged with the service. At 224, access modes can be defined for a service. This can include defining whether a service is polled for data results, the service broadcasts data after processing has been achieved, and/or the service is configured in a request and reply mode to exchange data in response to a specific request to the service. At 228, remote controller services are located. As noted above, this can include polling a UDDI directory to determine the service and respective interfaces. At 232, after a service has been located, data is exchanged with the service to affect operations of a control process (e.g., automatically exchanging I/O data with I/O service to automatically perform remote processing service). At 236, results are retrieved from a respective service in accordance with the access modes defined at 224. For example, a processing service may poll a status service at periodic intervals to retrieve plant floor status information that is aggregated from a plurality of network devices. At 240, one or more control actions may be performed based upon the results retrieved from 236. For example, an I/O service may energize an output device based upon a processing result received from a processing service.

Figure 4:
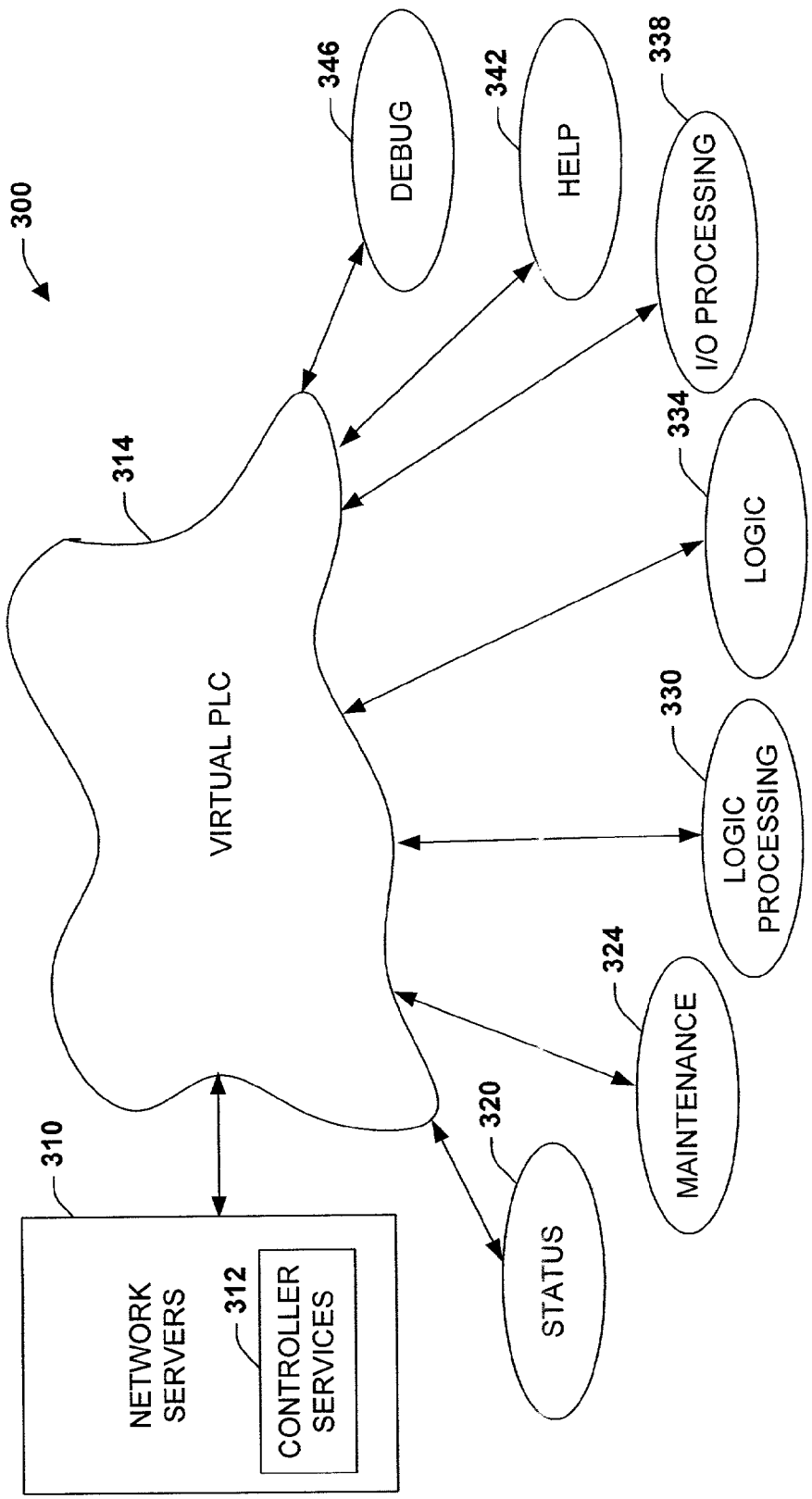
FIG. 4 is a schematic block diagram illustrating a virtual controller architecture in accordance with an aspect of the present invention.

Turning to FIG. 4, a system 300 illustrates a virtual controller architecture in accordance with an aspect of the present invention. In this aspect, a plurality of network servers provide controller services 312 to a network cloud 314 operating as a virtual control system. This can include such aspects as a server farm, wherein many servers cooperate to perform a control application (e.g., Apache Web servers offering controller services 312). As an example, a processing service can initiate a request (e.g., based on a remote operator or systems network request to load a file designated by the request) to receive logic from a logic service. The received logic can then be employed to contact an I/O service to control manufacturing operations (e.g., I/O service controls networked I/O or PLC systems operating I/O by transmitting and receiving XML input/output files). As noted above, virtual I/O can be utilized to interact with the processing service. For example, the I/O service can be configured to monitor remote web sites providing input data (e.g., XML files that serve web data directed to a process). If the input data changes, output data can be sent to the I/O service in the form of an XML file and in accordance with processing service operations. The output data may be in the form of control messages that are utilized by other services to control physical operations, and/or to construct data files that are read by systems and/or operators to perform further decisions (e.g., remote operator notified via e-mail if output data exceeds predetermined threshold, remote system changes logic operations based upon output data provided by the I/O service).

As illustrated, various industrial control system functions can be virtualized and provided by the controller services 312. These functions can include providing control system status at 320, conducting remote maintenance operations at 324 (e.g., fire a notification event based upon monitored data), performing logic processing at 330, downloading logic programs from remote locations at 334, performing physical and/or logical I/O processing at 338, serving help files at 342 to facilitate troubleshooting and maintenance of the control system, and/or providing debug information at 346 to facilitate starting and/or restarting an application (e.g., processing service timer has timed out, input data is outside of predetermined range, systems status bits reflecting error information).

Figure 5:
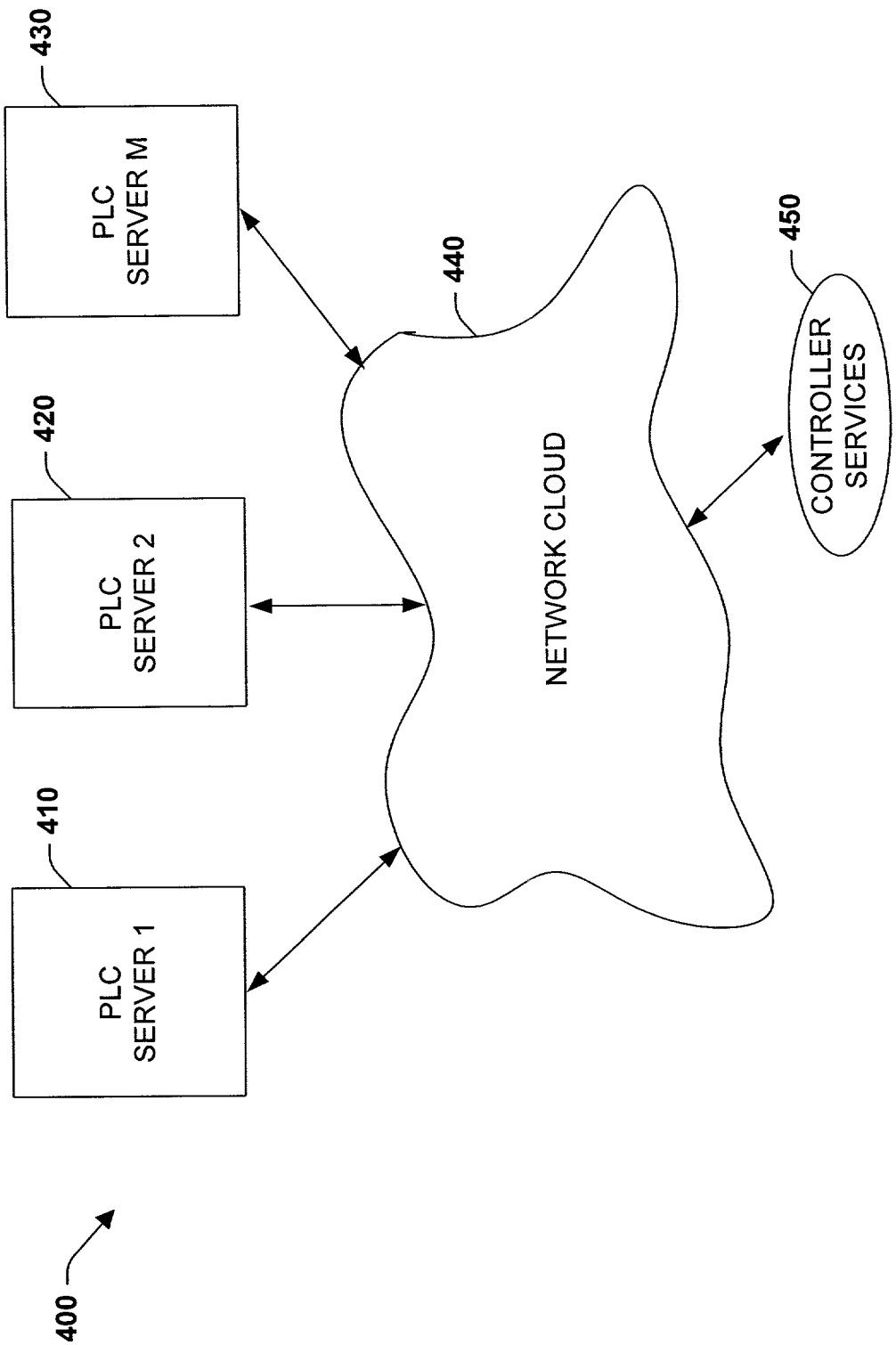
FIG. 5 is a schematic block diagram illustrating industrial controllers as network servers in accordance with an aspect of the present invention.

Referring to FIG. 5, a system 400 illustrates industrial controllers as network servers in accordance with an aspect of the present invention. In this aspect, a plurality of PLC systems 410 through 430 (may or may not have associated I/O modules) are adapted to serve a network cloud 440. In other words, if one or more controller services 450 are requested and/or initiated into operation by a remote system (e.g., work station, another PLC system, web browser, e-mail commands), then the requested services 450 are provided by the PLC systems 410 through 430. It is to be appreciated that the controller services 450 can be served from a combination of PLC systems 410–430 and/or remote network servers as discussed above in relation to FIG. 4.

According another aspect of the present invention, one or more of the PLC servers 410–430 may be configured with an operating system that is open and supportive of providing remote web services via XML protocols. For example, this can include providing a commercially available .NET framework or CE.NET (e.g., Microsoft) that operates according to a managed and open operating environment (e.g., controller objects are automatically garbage collected inside the framework when no longer in use). This can also include aggregation and integration of Web services, via .NET servers (or PLC's configured as such). For example, these servers can include Windows 2000, Microsoft SQL Server™, and Microsoft Exchange that offer XML core processing capabilities. Another type of server includes Microsoft BizTalk™ servers, which provide a higher level and greater flexibility of integration and aggregation. BizTalk Server 2000, for example, has a language built in called XLANG which enables definition of process flows, transaction flows and contacts, and facilitates integration across heterogeneous environments.

Figure 6:
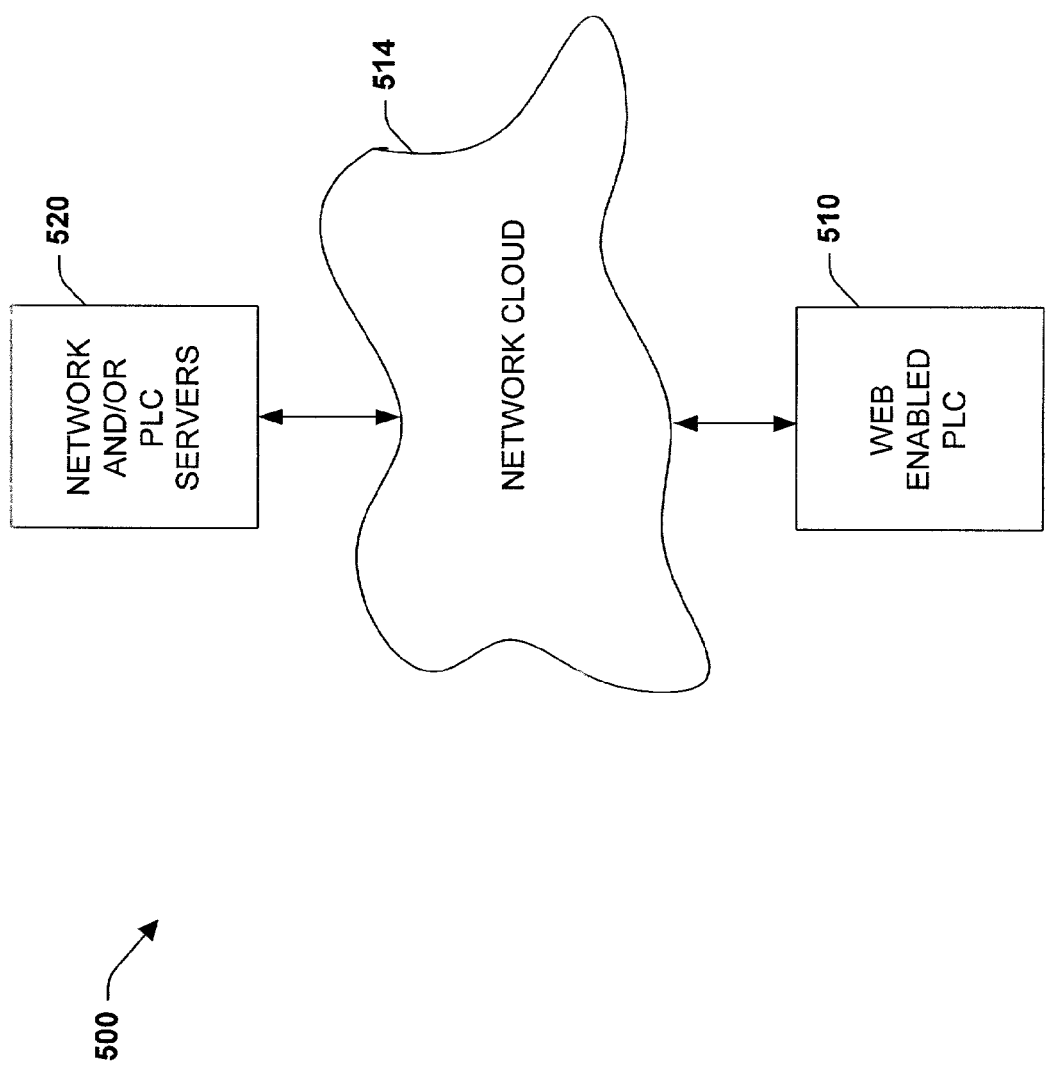
FIG. 6 is a schematic block diagram illustrating a web-enabled controller in accordance with an aspect of the present invention.

Referring to FIG. 6, a system 500 a web-enabled controller 510 is illustrated in accordance with an aspect of the present invention. In this aspect, a generic controller, workstation, and/or computer is provided at 510. All or most of the functionality for operating the controller 510 is performed via remote services provided from a network cloud at 514, wherein the cloud is served by remote network servers and/or PLC servers at 520. The controller 510 can be adapted to operate one or more remote services in order to perform a control application (e.g., download a file to controller directing which remote services to operate). For example, the controller 510, can load a logic program from a logic service and interact with an I/O service via the cloud 514 to begin control operations. As input conditions change via remote input changes provided by the I/O service, the controller 510 can perform logic operations that send XML output commands to affect operations under control of the I/O service. In another aspect, the controller 510 can pass data to a processing service, have the processing service perform logic operations on the data, and receive associated results of the logic operations in the form of an XML response from the processing service. This can also include directing the processing service from the controller 510 to a respective logic and I/O service before initiating the processing service. As can be appreciated, one or more of the services previously described can be executed from the controller 510 in various combinations.

Figure 7:
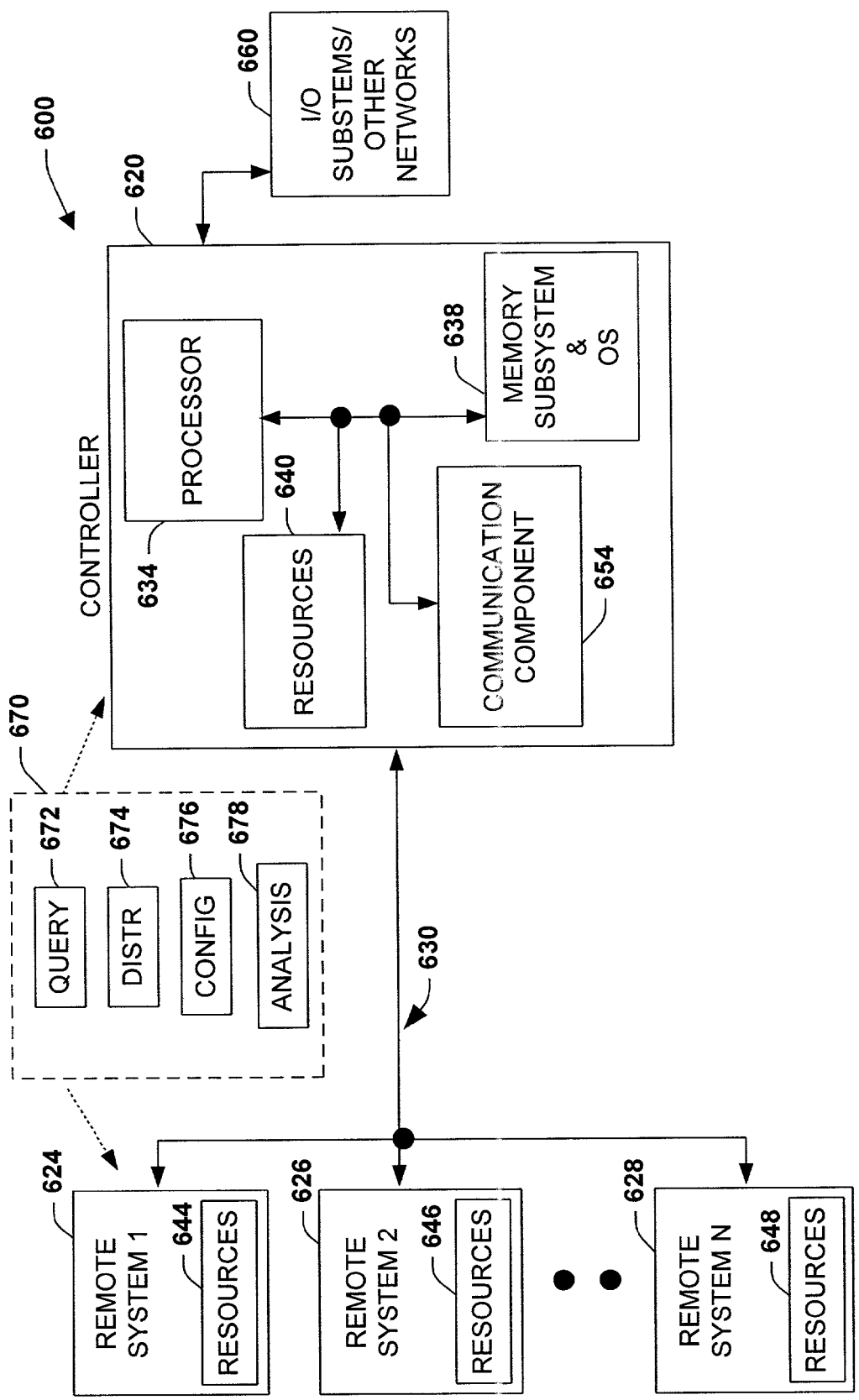
FIG. 7 is a schematic block diagram illustrating an industrial controller and distribution architecture in accordance with an aspect of the present invention.

Referring now to FIG. 7, an industrial control and distribution system 600 is illustrated in accordance with an aspect of the present invention. The system 600 includes an industrial controller 620 communicating to one or more remote systems 624–628 across a local factory and/or a public network 630 such as the Internet. This can also include other communications options such as phone connections and/or wireless connections. A processor 634 (or processors) in the controller 620 executes from an associated memory subsystem 638 that can also include an operating system (e.g., Microsoft® Windows®, NT/2000/XP, Windows CE, Linux, .NET, OS-9, UNIX, VRTXVRTX, QNX, VxWorks, CE.NET, custom-designed). It is noted that the controller 620 and/or remote systems 624–628 can be configured as severs that supply remote web services and/or as clients that receive remote web services in accordance with open interface standards and protocols, wherein the web services define one or more aspects of an industrial control system that are further described below (e.g., processor, I/O, data table storage, program logic, controller documentation, status and so forth).

The controller 620 and remote systems 624–628 maintain resources 640 through 648, wherein the resources are associated with various operational aspects of the systems that are provided as a web service. For example, the resources 640–648 can include memory/memory capacity, processor bandwidth or utilization information, processor execution logic, programs, variables, configurations, process information, batch information, and substantially any parameter and/or data that affects operational capabilities of the respective systems. As will be described in more detail below, the resources 640–648 can be described in a schema or list and passed between systems 620–628 in order to distribute one or more resource parameters or capabilities across one or more of the systems 620–628. It is noted that the remote systems 624–628 can be substantially any network device interacting with the controller 620. This can include personal computers, workstations, other controllers, communications modules, and so forth.

As an example, remote system$_2$ at reference numeral 626 can be another controller, wherein the controller 620 and remote system$_2$ (or other systems) exchange resource information to determine if the resources 640 and 646 can be transferred, shared, updated, offloaded, and/or coordinated to facilitate an automated manufacturing process. In addition, one controller can act as a master, whereby other controller systems interacting on the network 630 are synchronized or updated based at least in part on the resources maintained by the master. In another example, remote system$_1$ at reference numeral 624 can be configured as a network computer that maintains one or more lists of resources associated with one or more controllers or other network devices (e.g., lists describing controller web services). If conditions change, such as a detected change in load, change in logic programs, change in firmware revision, a design change, configuration change, I/O change and/or other changes, the network computer can distribute resources to the controllers in accordance with the lists (or other determinations) via a remote task such as a remote web service. In addition, the systems 620–628 can request information from controller components being served by remote web services in order to facilitate a distributed and coordinated control process.

A communications component 654 associated with the controller 620 (or remote systems) can be configured in one or more possible communications modalities such as a web server/client, e-mail server/client, voice mail server/client, and dial-in server/client, for example, wherein the modalities can be adapted in one or more possible modes such as polling modes, broadcasting modes, and/or request/reply modes to distribute, monitor, and/or exchange resources between remote systems 620–628. Although not shown in FIG. 7, the remote systems 624–628 can have similar communications capabilities as the controller 620. It is also noted that the controller 620 can communicate to various Input/Output subsystems 660 and/or other networks to control portions of a distributed manufacturing process (e.g., Analog, Digital, Programmed/Intelligent I/O modules, other programmable controllers, communications modules, networks).

According to one aspect of the present invention, a coordination component 670 is provided to support flexible exchanges of data and/or capabilities between the controller 620 and remote systems 624–628. The coordination component 670 includes at least one of a query component 672, a distribution component 674, a configuration component 676, and an analysis component 678. It is noted that the respective systems 620, and 624–628 can be configured similarly (e.g., all systems include components 672 through 678, all systems include at least component 674, and so forth), and/or can be configured having various combinations of components 672 through 678. For example, the controller 620 can be configured with the components 672 through 678, remote system$_1$ with components 676 and 678 and remote system$_2$ with components 672, 674, and 678. It is also noted that one or more of the components 672 through 678 may be adapted as a remote web service.

The query component 672 retrieves resource schemas, lists, data and/or locators (e.g., address pointers) from network devices to determine current controller resources (or other network device resources) such as processing capabilities, components installed, current configurations, and customer data, for example. This can include a controlled query of a data path to a network device over the network 630 and between various components communicating thereon. Queries can include sending query requests to dedicated IP addresses, according to address lists specifying several devices, and/or other type requests such as a dial-up request to a specified number, number list and/or a wireless request to a Wireless Area Network device (e.g., employing Wireless Markup Language (WML) schema). As will be described in more detail below, the query component 672 can receive a response to the resource request via an XML schema or other data transmission.

The distribution component 674 facilitates deployment of resources 640–648 via a deployment engine (described below) that distributes one or more of the resources across the network 630 and between one or more of the controller 620 and/or remote systems 624–628, and/or web services. Resource deployment can occur in connection with the query requests described above, for example, and/or also occur as part or a scheduled process or routine. This includes system reconfigurations, configuring systems from remote web locations, load balancing processor capabilities across systems, and general software or configuration deployments. The configuration component 676 supports coordination of resource configurations and/or settings across the system 610. This can include such aspects as network clock synchronizations, clock updates, configuration updates, and/or employment of an automated protocol selection procedure, for example, which are described in more detail below.

The analysis component 678 supports the query, distribution, and/or configuration components 672–676, including various system processing aspects such as determining system performance and/or distributing resources or processing capabilities (e.g., offloading processor functionality between web services). This can include applying artificial intelligence techniques to processing decisions including such techniques as Bayesian analysis and belief networks. Determinations include such aspects as load sharing analysis, resource allocation analysis, data prioritization, communication management and determining priority between recipients, as well as managing one or more events based upon the determined priority.

Figure 8:
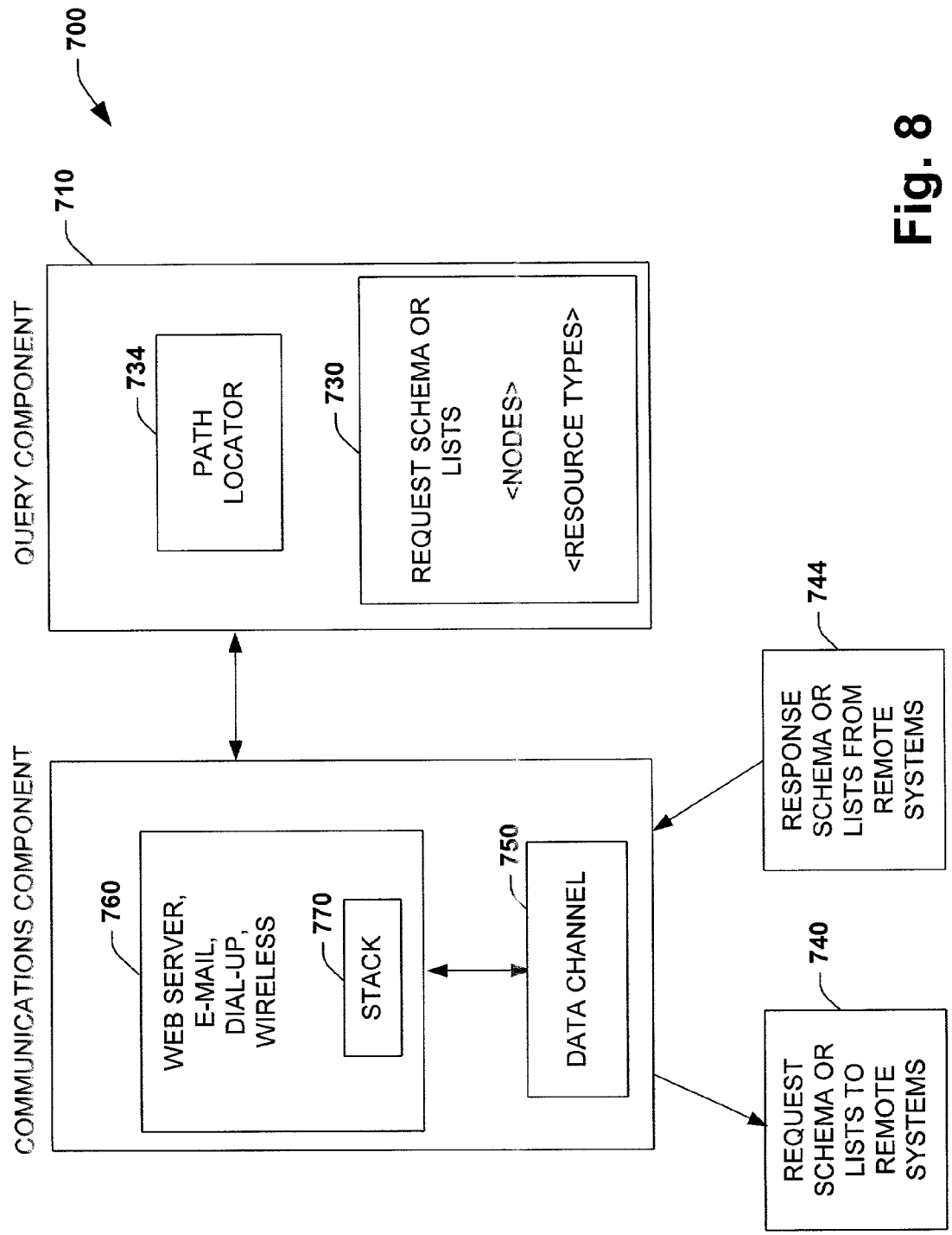
FIG. 8 is a schematic block diagram illustrating a query system in accordance with an aspect of the present invention.

Referring to FIG. 8, a system 700 illustrates a query component 710 and remote communications in accordance with an aspect of the present invention. The query component 710 interacts with a communications component 720 to transmit resource requests and receive resource responses from one or more remote systems (not shown). In addition, the query component 710 can configure a request schema 730 having one or more XML elements (defined by starting and ending tags with (</> symbols), arranged in substantially any order) that relate to one or more remote system nodes and associated resource types. Although not shown, the XML elements and associated tags can also include attribute information if desired, wherein an attribute is a name-value pair associated with an element start tag (e.g., <resource type memory="10 Mbytes">, <resource type CPU utilization="20%">).

A path locator 734 can be provided to indicate one or more node addresses and/or connection types/devices within the schema 730. The communications component 120 employs the path information in the schema 730 to retrieve resource information from the remote systems via a request at 740. It is to be appreciated that a single schema 730 can be broadcast to multiple nodes in performance of a query, or individual schemas can be sent to query a single node, if desired, wherein one or more remote system responses can be received at 744. The remote responses can also be in the form of XML schemas having path information describing where the response 744 originated from and including associated resource information relating to a respective node. It is noted that the responses 744 can include XML data and/or combinations of other data such as having an attached binary file that follows the response 744. For example, an element in the response 744 can specify whether the queried data is included in the XML schema or is included as an attachment thereto. As an example, coded information such as an executable may be transmitted in binary. Thus, an element in the response schema can indicate that one or more attached binaries follow the response at 744.

The communications component 720 interacts with the query component 720 in order to retrieve requested resource information and/or to initiate interactions with a emote web service. A data channel 750 (or data channels) can be configured to communicate with the remote systems via a communications processor 760. As illustrated, the communications processor 760 can be configured or adapted for a plurality of various communications options or combinations thereof such as a web server/client, e-mail server/client, dial-up server/client, wireless access server/client, and so forth, wherein respective server/client components can send information to and receive information from multiple remote systems. The data channel 750 can include at least one standard socket (e.g., HTTP) for web communications and/or other type sockets (e.g., Secure Socket Layer SSL Socket) to exchange information with remote systems. For example, the standard socket can be an HTTP socket, an FTP socket, a TELNET socket, and/or other network socket.

The communications processor 760 includes a socket interface (not shown) that directs/translates industrial controller communication protocols to/from TCP/IP (or other protocol) and is instantiated by a stack 770. For example, a socket instance, which may be invoked from a remote browser and/or other application, includes information about a controller such as an IP address and port address. The stack 770 presents a layered communications interface to networks such as the Internet and may interface to one or more drivers to communicate with remote systems. One possible driver is a point-to-point (PPP) driver (not shown) for communicating over a phone line. Another possible driver is an Ethernet driver (not shown) that communicates through a Local Area Network (LAN) to remote systems. It is to be appreciated that a plurality of other drivers and network interfaces are possible (e.g., wireless LAN driver).

The stack 770 (e.g., TCP/IP stack) may be associated with one or more other network layers. A physical layer may be provided that defines the physical characteristics such as electrical properties of a network interface. A data-link layer defines rules for sending information across a physical connection between systems. The stack 770 may include a network layer, which may include Internet protocol (IP) that defines a protocol for opening and maintaining a path on the network. A transport layer associated with the stack 770 may include Transmission Control Protocol (TCP) (or other protocol) that provides a higher level of control for moving information between systems. This may include more sophisticated error handling, prioritization, and security features. A session layer, presentation layer, and application layer may also be optionally included that sit above the stack 770.

Figure 9:
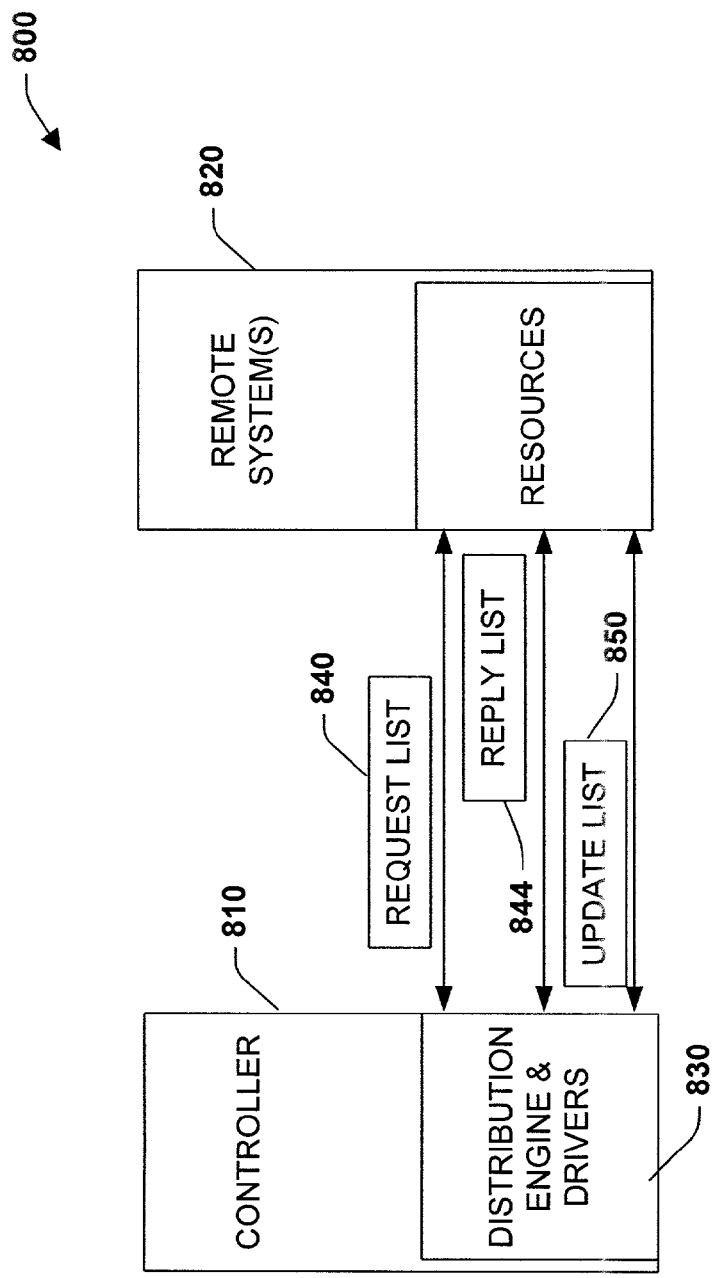
FIG. 9 is a schematic block diagram illustrating a distribution system in accordance with an aspect of the present invention.

Referring now to FIG. 9, a deployment system 800 is illustrated in accordance with an aspect of the present invention. Although resource distribution is depicted between a single controller 810 (or network device) and a remote system 820, it is to be appreciated that the controller may distribute resources to a plurality of such systems. A two-level architecture 830 may be provided including a distribution engine and drivers to propagate resources to/from remote systems 820. For example, there may be a distribution driver for respective resource types (e.g., files, controller settings, data table, memory, customer-specified data, system performance parameters such as processor/memory utilization and so forth). The drivers may be responsible for reading and writing resource types, wherein the distribution engine may be responsible for coordinating resource distributions among drivers, remote systems, and associated data paths. One or more schemas or lists (e.g., XML, SOAP, WSDL) can be provided to facilitate communications and resource distribution to, from and/or between the remote systems 820 and/or controller 810. For example, this may include: a request list 840 (e.g., describing one or more available resources from a controller, requesting desired or potential resources from remote systems), a response list 844 (e.g., resources actually available from the remote system, resources needed by the remote system), and/or an update list 850 (e.g., actual resources sent to and/or received from remote systems and/or may contain pointers to external storage locations, controller sites, and/or network devices).

The distribution system 800 can operate in a plurality of modes to propagate changes throughout the remote systems 820. For example, an automatic mode may be provided which enables updates to occur when new or changed resources have been provided to the controller 810 and/or remote systems 820. Also, there may be a synchronization mode, which may run a check of resource items (e.g., at predetermined intervals, when changes are detected, via programmed logic instructions) against other remote systems to facilitate sharing and/or balancing of resources between systems. During a distribution between systems, the request list 840 may be sent to the remote system 820 from the controller 810, for example. The remote system may then check its own resources and reply with the response list 844 that requests resource changes needed. The controller 810 may then respond with the update list 850 providing the information requested for that update. During an automatic or scheduled distribution, the distribution engine may send update lists 850 to one or more remote systems 820 informing them of changes as they occur on the controller 810. For example, the update list 850 may be an XML blob that describes what the update is, what data is being updated, and the actual update—if desired. There may be an action parameter or flag (not shown) that describes how the updated item should be handled during automatic updates. For example, the parameter's value may be configured to a first value to update and/or change an existing item, configured to a second value to delete an existing item, and/or configured to a third value to create a new item. It is to be appreciated that resource allocation can occur in a bi-directional manner in accordance with the present invention, whereby the controller 810 and/or the remote systems 820 can request for and/or respond with one or more available resource items.

Figure 10:
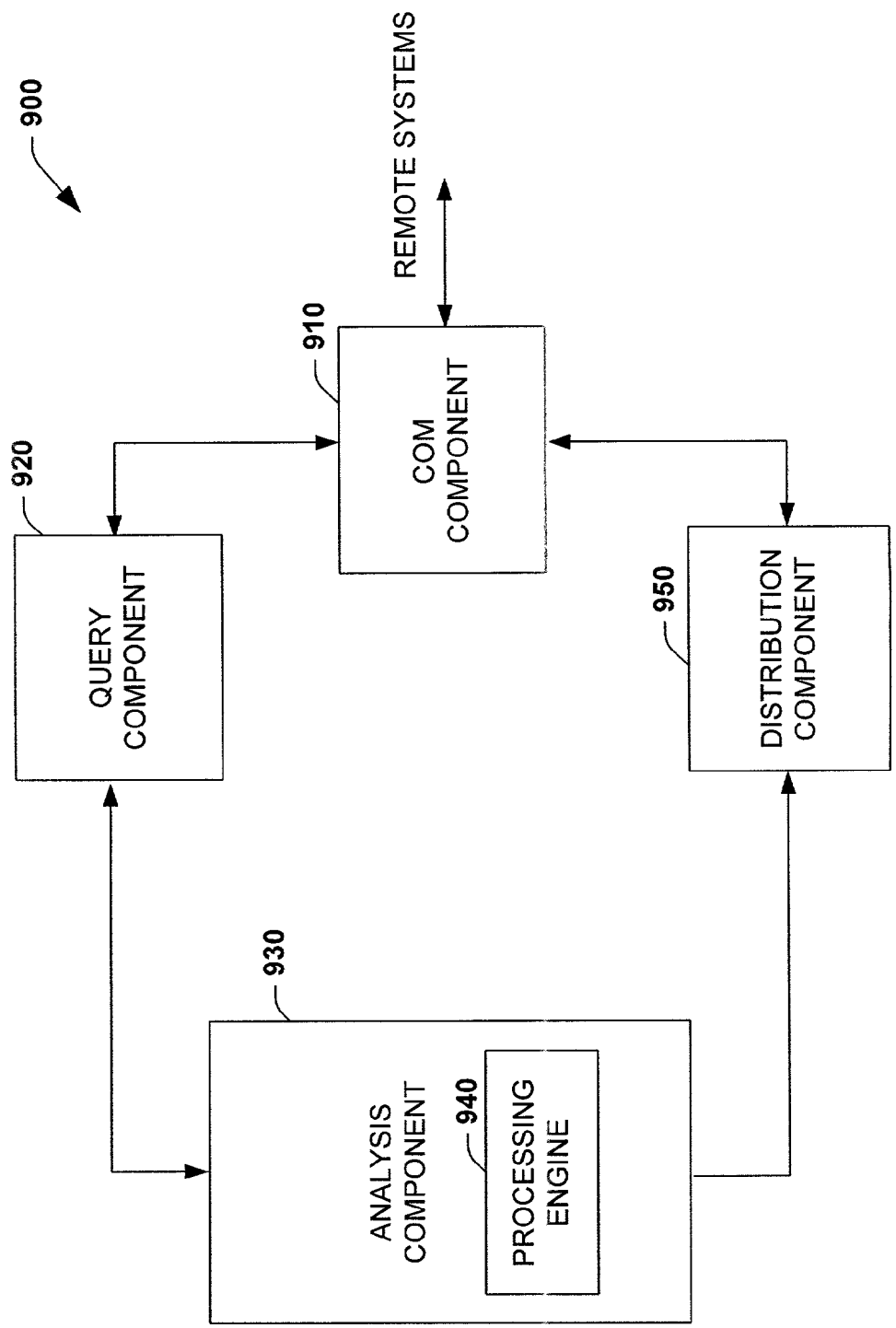
FIG. 10 is a schematic block diagram illustrating an analysis system in accordance with an aspect of the present invention.

Referring to FIG. 10, an analysis system 900 is illustrated in accordance with the present invention. The system 900 includes a communications component 910 to interact with one or more remote systems (not shown). A query component 920 determines available resources associated with the remote systems via the communications component 910 (e.g., querying an I/O web service for I/O data or resources), wherein an analysis component 930 employs a processing engine 940 to automatically and dynamically coordinate processes/resources between web services, industrial controllers and/or other remote systems providing web services.

A distribution component 950 is provided to adjust resources between one or more systems based upon commands received from the analysis component 930. It is to be appreciated however, all or portions of query and/or distribution functionality can be provided within the analysis component 930.

The analysis component 930 monitors/determines overall system 900 performance/resources via the query component 920 and alters, adjusts, and/or tunes the performance based on decisions determined in the processing engine 940. For example, this can include rules-based determinations (e.g., if this queried condition or event occurs, then perform one or more distribution/control actions), algorithmic determinations, and/or other determinations such as statistical analysis, probabilistic analysis, and/or higher-level inference analysis that may be applied in accordance with artificial intelligence techniques which are described in more detail below.

Based on an analysis of the system resources, the processing engine 940 can perform a plurality of various actions to cause changes in system operations, performance, and/or configuration. It is to be appreciated that changes can also occur based upon regularly scheduled events such as routine maintenance conditions (e.g., flag fired from a timer or a calendar) and/or in accordance with predetermined time intervals. As an example, system reconfigurations are possible wherein one or more remote systems are updated according to changes detected by the analysis component 930 (manual and/or automatic changes) that includes distributing such items as programs, firmware, configuration settings, general software deployments and/or other data. This can also include configuring systems from remote web locations such as from a workstation or a controller. In another aspect, processor capabilities can be load balanced or distributed across systems. As an example, a remote station may indicate that its memory is about full (e.g., via query and associated schema). The analysis component 930 can then query other systems and/or stations for available storage capacity, find an available location for storage, and communicate an address listing the site whereby the remote system can possibly offload data stored therein. As an example, a static recipe, batch file, a help file, or other type data may be accessed infrequently. Thus, offloading storage of this type data may not cause any decrease in performance when the remote system needs to access such data during the course of operations.

In another example, a remote system acting as a web service may indicate that a processor is executing at 98% of available processing bandwidth. This may involve a large amount of network processing, wherein the remote system is reading commonly available network data and performing large amounts of data processing on the data to produce and return the result back to the network. The analysis component 930 can query other remote systems, determine a processor that has available bandwidth and offload the task to that system. This can include relocating and redistributing tasks in accordance with logical and physical processor or component locations. In one aspect, this can include bundling code and associated data (e.g., pushing a copy of a logic program or processor executable instructions onto a communications stack) on the over-burdened machine and transferring the bundled code and associated data between devices to further distribute and balance processing capabilities. In this manner, more continuous and/or balanced process controls can be provided. Furthermore, this can include starting and stopping web services as processing conditions change. In addition, the system 900 enables automatic tuning and/or dynamic regulation of an overall process that is controlled by multiple systems and/or web services. Other configuration aspects include configuring multiple stations in support of a more consistent processing load. It is noted that load balancing can also occur by having multiple processors or services execute similar tasks, wherein tasks are selectively enabled and disabled by the analysis component 930.

In support of the query, distribution, and configuration components, the analysis component 930 and processing engine 940 include other system processing aspects. This can include applying artificial intelligence techniques to processing/deployment decisions including such techniques as Bayesian analysis and belief networks. This type analysis can be employed to determine such aspects as data prioritization, communication management and priority between recipients, as well as managing one or more events based upon the determined priority. Other analysis aspects can include transforming data between protocols such as XML and local controller protocols to facilitate more efficient processing of data acquired from multiple sources. For example, a plurality of XML files, schemas or blobs may be received from remote systems describing various resources. Although the XML data can be processed in its present form, it may be more efficient to transform all or portions of the data to a different form such as a binary file, HEX file, a structure, an array, and/or other form before processing begins. This can include applying higher level language functions (e.g., convert ASCII to binary ( ), define structure, format array) that are commonly available in compiled code such as object languages, C and C++, for example. This can also include instruction sequences that input a known code type (e.g., XML), and maps the code type to one or more other code types in accordance with the mapping (e.g., characters such as 20 followed by % maps ASCII 20 into binary 20 followed by multiplication of 0.01).

In accordance with one aspect of the present invention, system performance can be determined in a regular manner according to a regular query of resources initiated by the analysis component 930. For example, inputs, data, a sequence of data, a variance of data and/or patterns of data or inputs can be monitored for possible trends in the data (e.g., at about 2:00 AM, processor at station B experiences a dramatic decrease in CPU capacity). This can include statistical or probability analysis to determine if a possible performance and/or distribution condition has occurred. As one particular example, resource or other type data can be monitored over time, whereby if the data falls outside of a predetermined range, an outside range event is generated and subsequently processed by the processing engine 940. However, this data may generally subscribe to a detectable, modeled, and/or predictable pattern during normal operations within the range. Thus, if the pattern changes—even though the data is still within the predetermined range, a different type event can be triggered causing different decisions to be executed in the processing engine 940.

These type decisions can include inference, statistical, and/or probability analysis at 940 for a subset of resources, data or inputs that are queried and monitored for routine or modeled patterns over time. If the data subset deviates from the determined pattern, internal events can be fired in the processing engine 940 that invoke one or more actions such as searching for other available resources, transferring processing capabilities between stations, putting additional processors online, and alerting other systems or users, for example. Data patterns can be determined in accordance with a plurality of techniques. A statistical analysis of data or inputs can include substantially any technique such as averaging, standard deviations, comparisons, sampling, frequency, periodicity and so forth.

In another aspect of the present invention, data patterns (e.g., patterns of queried resources over time) or processor/system operations can be stated as a general probabilistic estimate to determine a performance condition given monitored evidence of an input pattern or occurrence. The estimate can be stated as:

EXAMPLE 1

$$Pr(Cp|E_1, E_2, \ldots E_J);$$

wherein Pr is a probability, Cp relates to a monitored performance condition given evidence E relating to deviations or differences from monitored patterns or models, and J being an integer. This can also include evidence of consistency with a previous pattern to predict likely future outcomes or performance conditions. Thus, probability thresholds can be configured that fire an internal event (leading to action) based upon the probability estimate being above a predetermined probability threshold (e.g., 90% determination system performance condition or data pattern will likely occur in the future based on previous patterns).

It is noted that probability models can be constructed from typical controller or system operations. This can include monitoring resources for typical variances and monitoring such aspects as how often particular events occur (e.g., processor or web service operating at station C produces 1 less product per minute when processor D an E increase network communications). In addition, inference models can be constructed such that multiple and/or unrelated events are analyzed (e.g., processor A an B generally operate independently of processor C and D, thus there generally should not be any cause and effect between system operations). This can possibly indicate that a problem may occur or that resources may need to be allocated in a different manner (e.g., when processor A executes batch T, send system flag to processors C and D to reduce network communications by 25%). For example, if a large increase in network communications is detected, and an associated decrease is detected with the number or type of I/O samples received over time, then a possible inference is that system processing capabilities have become overloaded or network activities have induced noise problems in the I/O subsystem. It is to be appreciated other inferences can occur and that more or less general inferences can also be determined.

Classification models can be constructed that learn routine behaviors or patterns in order to generate probabilities that predict possible future patterns. For example, such techniques can include Support Vector Machines (SVM), Naive Bayes, Bayes Net, decision tree, similarity-based, vector-based, and/or other learning models or combinations thereof. Classifiers can be stated as a function that maps an input attribute to the confidence that the input belongs to a class. In the case of pattern recognition, attributes can be typical data subsets or values sampled over the course of time (e.g., resources queried from a plurality of systems at predetermined intervals) and/or include other pattern-specific attributes derived from the data subsets. It is noted, that modeled patterns and/or the analysis described above can cause automated actions to occur to more evenly and/or efficiently execute a manufacturing process. Alternatively, modeled or determined tendencies can be reported to users or operators, wherein a manual flag can be set by the user—before automated actions begin, in order to indicate that it is a suitable time to implement a possible automated action (e.g., implement processor or web service load sharing during plant maintenance operation).

Figure 11:
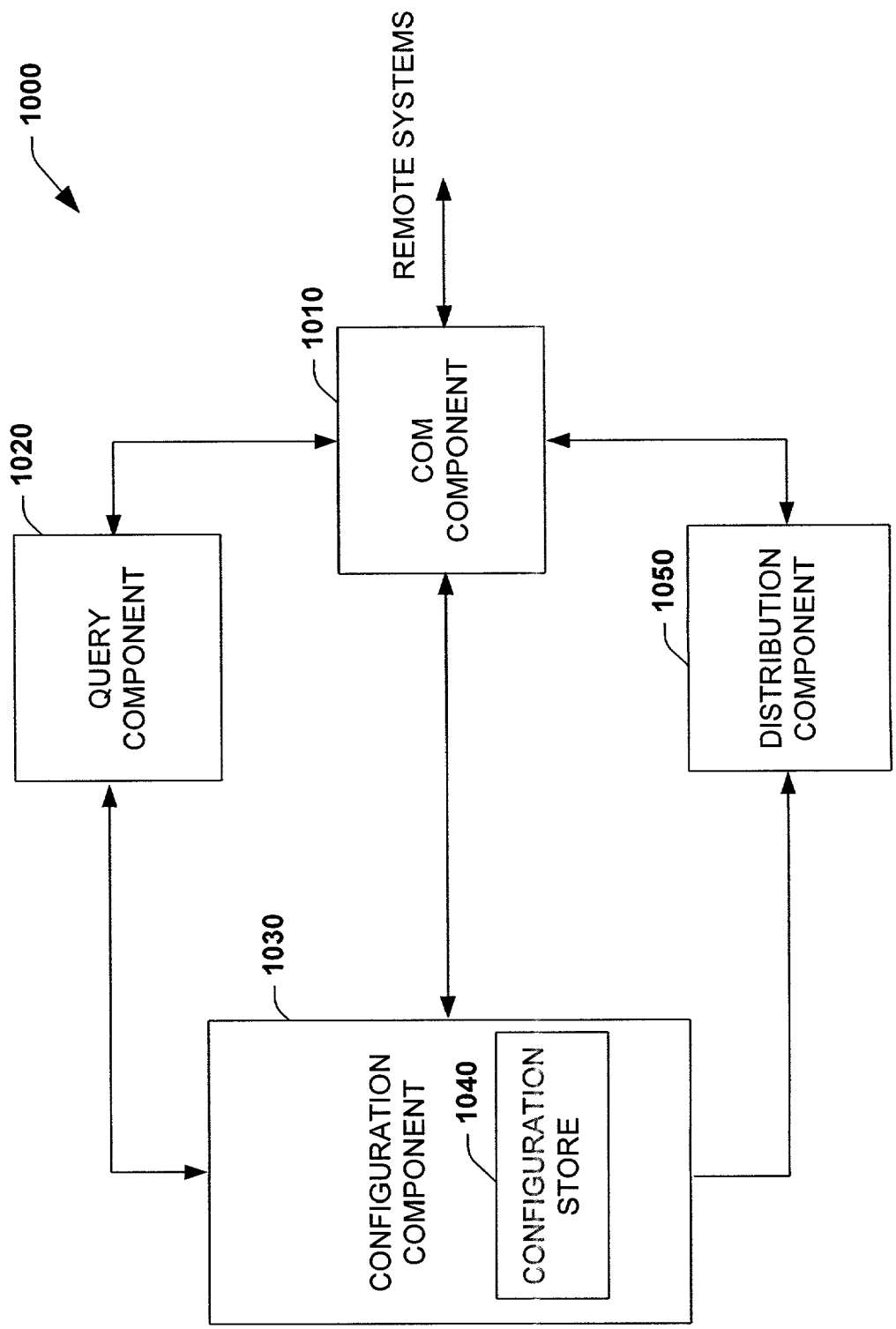
FIG. 11 is a schematic block diagram illustrating a configuration system in accordance with an aspect of the present invention.

Turning now to FIG. 11, a configuration system 1000 is illustrated in accordance with the present invention. The system 1000, which operates similarly to the analysis system described above, includes a communications component 1010 to interact with one or more remote systems (not shown). A query component 1020, can be optionally provided to determine available configurations associated with the remote systems or web services via the communications component 1010, wherein a configuration component 1030 employs a configuration store 1040 to coordinate configurations between industrial controllers and/or other remote systems. The configuration store 1040 can include such aspects as system parameters, settings, protocol configurations, and/or other system data. Thus, if changes are detected in the configuration store 1040, configuration updates can be initiated to other systems. As noted above, updates can occur periodically, wherein at predetermined or scheduled intervals, one or more remote systems and/or services are updated in accordance with at least a portion of the contents of the configuration store 1040.

A distribution component 1050 can also be provided to adjust configurations—which can include one or more of the resources described above, wherein adjustments are provided to one or more remote systems based upon commands received from the configuration component 1030. It is also to be appreciated however, all or portions of query and/or distribution functionality can be provided within the configuration component 1030. In addition, the configuration component 1030 can cooperate with the analysis component described above to determine if one or more configurations or settings should be propagated to other systems.

The configuration component 1030 supports such aspects as network clock synchronizations, clock updates, and employment of an automated protocol selection procedure. This can include reading remote web locations for a standard time, (e.g., Greenwich Standard Time) and propagating the time between systems with suitable adjustments if necessary for communications delays. Alternatively, the configuration component 1030 can induce one or more remote systems and/or services via network commands to perform a clock update procedure such as reading a remote web site for the clock data, and/or performing a real time update in accordance with a localized clock or shared signal.

In another aspect, the configuration component 1030 can cause the communications component 1010 to alter communications protocols in order to communicate with various remote networks. This can include configuring an Ethernet or other type device for example, to translate a first protocol to a plurality of various other communications protocols. For example, one remote system may be adapted for communications on a gateway or local wireless network. The communications module 1010 upon receiving a command from the configuration component 1030, can switch protocols from a standard network protocol (e.g., Ethernet/IP), to a native protocol employed by the remote system. The remote system or service can be configured to communicate upon receiving a network command sequence in its native protocol, yet, ignore standard protocol commands. Alternatively, the communications component 1010 can induce a remote network switch to activate when attempting to access the remote system in its native protocol (e.g., electronic switch that switches from network connection A to connection B).

In another aspect of the present invention, Dynamic Host Configuration Protocols (DHCP) can be employed in accordance with the configuration component 1030, the communication component 1010 and/or distribution component 1050 to facilitate more automated determinations of network configurations. Dynamic Host Configuration Protocol is a communications protocol that enables automation of assignment of Internet Protocol (IP) addresses in a controller network. Utilizing the Internet Protocol, respective machines that can connect to the Internet generally require a unique IP address. Thus, without DHCP, IP addresses may have to be entered manually at respective controllers/computers and, if computers move to another location in another part of the network, a new IP address is subsequently entered. DHCP facilitates distribution of IP addresses from a central point and automatically sends a new IP address when a network device such as a controller is coupled into a different place in the network. DHCP also supports static addresses for devices containing web servers that need a permanent IP address. DHCP can be employed as an alternative to other network IP management protocols, such as Bootstrap Protocol (BOOTP) that is also supported by the present invention. Although, DHCP may be considered a more advanced protocol, both configuration management protocols are commonly employed. It is noted that a DHCP or BOOTP client is a program that is located in (can be downloaded via distribution component 1050) respective controllers or remote systems so that it can be configured.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An open industrial control system, comprising:
a plurality of components cooperating to provide industrial control via a network, the components including a processing component, a logic component, and an Input/Output (I/O) component, at least one of the plurality of components is an industrial control system component configured as a web service; and
an interface that facilitates control interactions between at least one of the plurality of components and the at least one web service, the interface is an open standards Web Services Description Language (WSDL) that describes how to interact with the web service in order to provide industrial control.

2. The system of claim 1, the network is at least one of the Internet and a local factory network.

3. The system of claim 1, the WSDL describes an XML format for control system requests and responses.

4. The system of claim 1, further comprising a Simple Object Access Protocol (SOAP) to communicate with the interface, at least one of the plurality of components, and the web service.

5. The system of claim 4, the SOAP protocol is described in XML and includes at least one of a Remote Procedure Call, a wrapper for the web service, and a binding component.

6. The system of claim 1, further comprising a discovery component to facilitate locating the web service and determining web service functionality.

7. The system of claim 6, the discovery component is a Universal Discovery Description and Integration component (UDDI) providing a directory to access available web services.

8. The system of claim 7, the directory includes XML entries describing at least one of yellow pages, white pages, and green pages to locate and determine the web service.

9. The system of claim 1, the processing component executes logic programs provided by the logic service.

10. The system of claim 1, the processing component interacts with the I/O service to perform control operations, the I/O service providing at least one of physical and logical I/O operations.

11. The system of claim 10, the logical I/O operations are provided from remote web sites, physical I/O operations are provided from at least one of a network enabled I/O device and a Programmable Logic Controller (PLC) system.

12. The system of claim 1, further comprising a status component to provide information relating to a status of at least one of the processing component and the I/O component, the status including error information, maintenance information and communications information.

13. The system of claim 1, the web service is operated from at least one of a remote network server, a network server cluster, a PLC system, and a PLC system cluster.

14. The system of claim 13, the network server, the network server cluster, the PLC system, and the PLC system cluster are configured in accordance with a .NET framework.

15. The system of claim 14, the network server and the network server cluster are provided by at least one Apache server.

16. The system of claim 1, further comprising at least one of a generically configured computer, workstation, and a PLC that interacts with at least one of the processing component, the I/O component, and the logic component to enable a web-based PLC via the web service.

17. The system of claim 1, further comprising a communications component, the communications component including at least one of a web-server/client, an email server/client, a dial-in server/client, and a voice mail server/client.

18. The system of claim 17, the communications component including at least one of a stack and a data channel to process remote network requests and to transmit remote data.

19. The system of claim 1, further comprising a query component to retrieve controller-based resources associated with a control process.

20. The system of claim 19, the query component employs at least one of a request schema, a response schema, and a path locator to determine the controller-based resources.

21. The system of claim 20, the response schema and the reply schema are described in XML, the schemas including a node address, and at least one resource type element.

22. The system of claim 21, the at least one resource element specifies at least one of memory capacity, processor bandwidth, processor utilization information, programs, variables, configurations, process information, batch information, parameters and other data that affects operational capabilities of the system.

23. The system of claim 1, further comprising at least one of a distribution engine and associated drivers to propagate controller-based resources between systems.

24. The system of claim 23, the drivers facilitate reading and writing resource types, the distribution engine coordinates resource distributions among at least one of the drivers, remote systems, and associated data paths.

25. The system of claim 23, further comprising at least one of a request list that describes at least one of available resources and potential resources from remote systems, a response list that describes at least one of resources actually available from the remote systems and resources needed by the remote systems, an update list that describes at least one of actual resources sent to the remote systems and actual resources received from the remote systems.

26. A method to facilitate open and distributed control in an industrial controller environment, comprising:
configuring at least one component in an industrial control process as a web service;
defining an open interface standard to communicate with the web service;
employing an XML-based protocol to communicate with the interface; and
interacting with the at least one component across a network to manage the industrial control process via the interface and the protocol.

27. The method of claim 26, further comprising configuring the interface via a Web Service Description Language (WSDL) and employing Simple Object Access Protocol (SOAP) as the XML-based protocol.

28. The method of claim 26, further comprising defining a service type and associated service data relating to a control process.

29. The method of claim 26, further comprising defining access modes for interacting with the industrial control process.

30. The method of claim 29, the access modes include at least one of a polling mode, a broadcast mode, a request mode, and a reply mode.

31. The method of claim 26, further comprising adapting a Universal Discovery Description and Integration component (UDDI) to locate available web services.

32. The method of claim 26, the at least one component is configured as at least one of a processing service, a logic service, an I/O service and a status service.

33. The method of claim 26, further comprising configuring at least one of a remote network server, a network server cluster, a PLC system, and a PLC system cluster to deliver the web service.

34. A system to facilitate open and distributed control in an industrial controller system, comprising:
means for adapting a plurality of industrial control components to at least one web service;
means for defining an open communications standard;
means for interfacing to the at least one web service via the open communications standard;
means for communicating with the at least one web service via a scripting technology; and
means for interacting with the plurality of components across a network to provide a virtual controller operating platform.

35. A web-enabled control system, comprising:
a processing station to interact with a network;
a downloadable control file to direct network operations of the processing station;
a plurality of controller service components, the controller service components including at least one of a processing component, a logic component, an Input/Output (I/O) component, and a status component, the controller service components are industrial control system components configured as web services, the control file initiates operations of at least one of the controller service components via the network;
at least one XML-based protocol that specifies an open standard for interaction via the network; and
an interface that employs the at least one XML-based protocol to communicate between the controller service components and the processing station to facilitate control interactions between the controller service components.

36. The system of claim 1, further comprising a distribution component configured as a web service, the distribution component deploys at least one resource to facilitate load balancing between networked components in the industrial control system.

* * * * *